Figure 2:
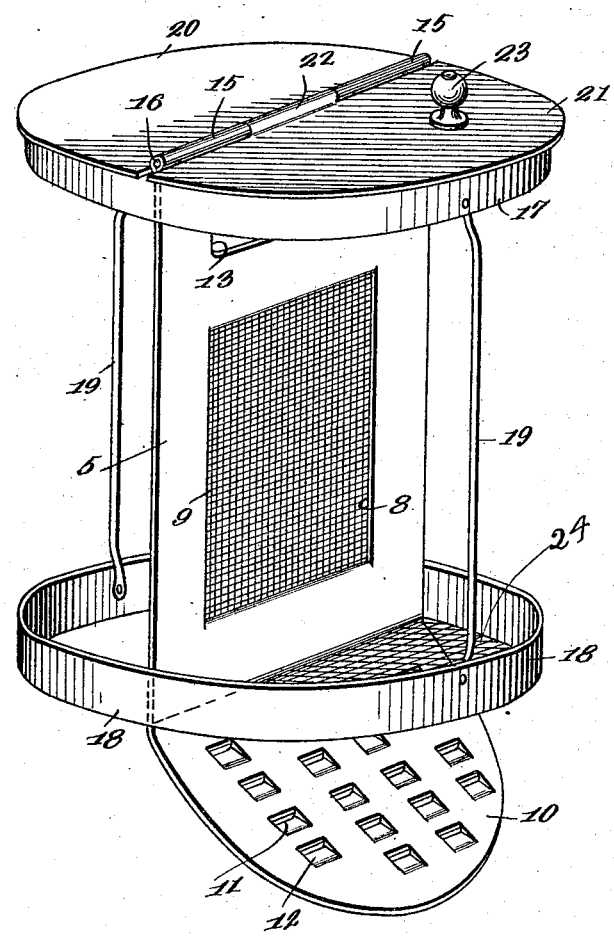

J. THOMAS.
COFFEE POT.
APPLICATION FILED APR. 15, 1914.
1,188,341.
Patented June 20, 1916.
2 SHEETS—SHEET 1.
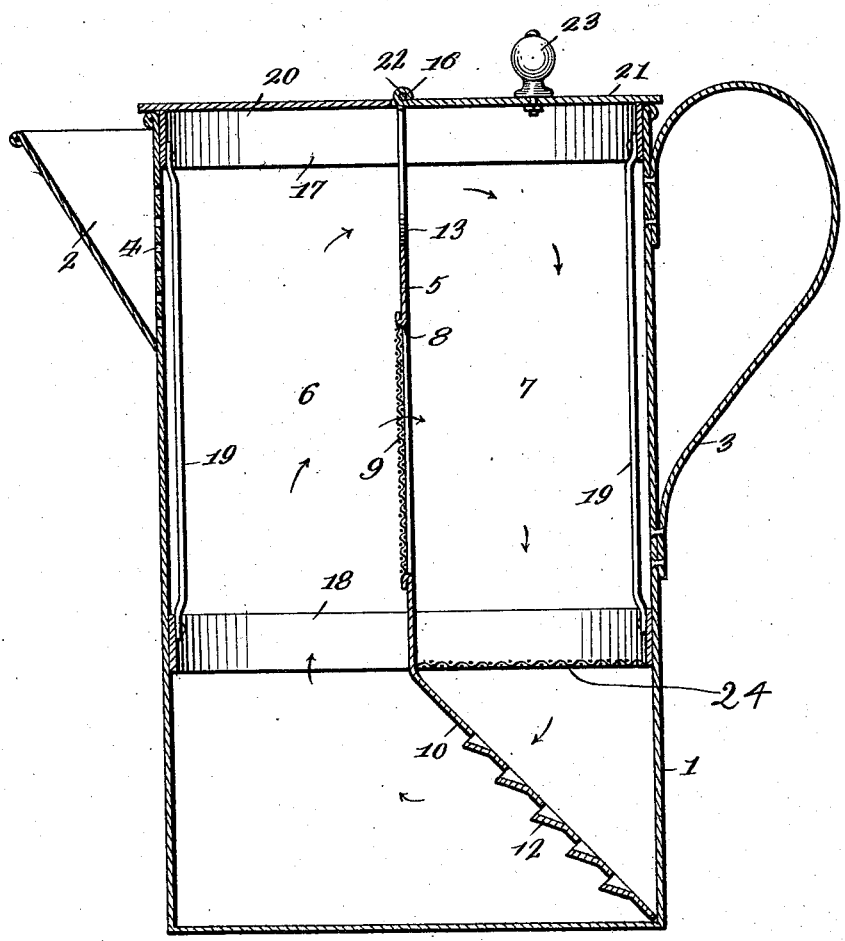
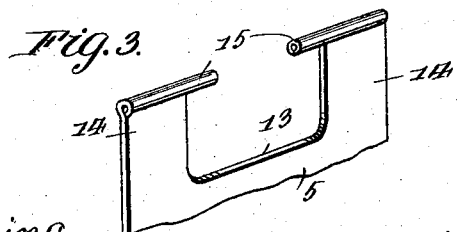
Witnesses
Guy M. Spring.
W. E. Valk Jr.
Inventor
James Thomas.
By
his Attorney

J. THOMAS.
COFFEE POT.
APPLICATION FILED APR. 15, 1914.

1,188,341.

Patented June 20, 1916.
2 SHEETS—SHEET 2.

Witnesses
Guy M Spring.
W E Walker

Inventor
James Thomas.

By Robert Bower,
his Attorney

UNITED STATES PATENT OFFICE.

JAMES THOMAS, OF ST. LOUIS, MISSOURI.

COFFEE-POT.

1,188,341.  Specification of Letters Patent.  Patented June 20, 1916.

Application filed April 15, 1914. Serial No. 832,076.

*To all whom it may concern:*

Be it known that I, JAMES THOMAS, a subject of Great Britain, residing at St. Louis, State of Missouri, have invented certain new and useful Improvements in Coffee-Pots, of which the following is a specification.

My invention relates to an improved form of receptacle or pot to be used in the brewing of coffee or the like.

As its primary object, the invention contemplates a coffee pot so constructed or formed as to prevent, first, when in use and under ordinary conditions, the boiling over of the liquid therein; second, to prevent the coffee from directly contacting the heated metal next to the stove, thereby preserving the aroma of the berry or bean; third, to insure freedom from "grounds" or deposit when dispensing; and fourth, to obtain greater speed in the preparation of the beverage for use.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a longitudinal sectional view of a coffee pot constructed in accordance with the present invention; Fig. 2 is a detail perspective view of the removable part or parts of the pot; and Fig. 3 is a fragmentary perspective view of the coffee pot partition.

Before proceeding with the description of the drawings, I desire to call particular attention to the fact that while I have evolved my invention with particular reference to its application in connection with the preparation or brewing of coffee, the same may be readily utilized to facilitate preparation of like beverages wherein a like structure might be used to advantage.

Referring now to the drawings by numerals, 1 designates as an entirety the coffee pot, the said pot having associated therewith the usual spout 2, handle 3 and perforations 4, the latter serving as a strainer, the perforations being disposed in that portion of the pot 1 inclosed by the spout 2.

Although the pot herein illustrated is provided with straight sides, this being the cheapest and most practical, the shape of the pot may be varied as desired, the removable part however (to be hereinafter fully described) being correspondingly changed for an obvious purpose. Within the pot 1 is removably arranged a partition 5, said partition dividing the pot into a forward compartment 6 and a rear compartment 7. Said partititon 5 is provided with an opening 8 over which a wire mesh screen 9 is arranged, said opening 8 effecting communication between the said two compartments. The inner or lower end of the partition 5 is bent at a 45° angle as indicated at 10, the angularly disposed portion of the said partition being provided with a plurality of openings 11 formed by cutting the said partition and bending the tongues 12 formed thereby as indicated in Fig. 2 of the drawings. The top of the partition 5 is cut away as indicated at 13 to open communication between the compartments 6 and 7 at the top thereof, the extensions 14 formed at each side of the opening or passage way 13 being rolled as indicated at 15 in Fig. 3 of the drawings to provide bearings for a suitable hinge pin 16 extending therethrough.

Guide bands 17 and 18 respectively are made rigid with the partition 5 and disposed, one at the top thereof, and the other at a point just above the angularly disposed portion 10 thereof. Said bands 17 and 18 are, in the assembled position of the elements constituting the improvement, adapted for frictional engagement with the interior wall of the pot and serve as a means whereby the said partition 5 is positioned in the desired manner. A wire mesh screen 24 is secured to the base of the guide band 18, said screen being situated in compartment 7 to form, in conjunction with this half of the said band a receptacle or pocket upon which rests the powdered coffee or the like during the process of percolation. Brace rods 19 connect the bands 17 and 18 at diametrically opposite points.

The top of the pot is made in two sections, one of the sections 20 being rigid with the top band 17, said section being semi-circular in form and of a size to extend slightly beyond the edge of the pot whereby to support the bands 17 and 18 as well as the partition 5 in place. The other section 21 of the pot top is also semicircular, it however being provided with a rolled tongue 22 through which the hinge pin 16 above mentioned extends, this arrangement providing a hinge for the said section 21 whereby the same may be raised and lowered and access to the pot interior, particularly compartment 7, freely had. A knob 23 may be made rigid with the top section 21 for an obvious purpose.

The operation, as is apparent upon application to Fig. 1 of the drawings, is as follows: The coffee or the like to be brewed is placed in the rear compartment 7 of the pot where it is free to fall upon the screen 24. Water is next added as usual. The pot is then placed upon the source of heat, and, as the bottom of the pot is entirely free from grounds (which are a great non-conductor of heat) the heat is allowed to have free access to the liquid within the pot, thereby setting up a heated current, represented by the arrows in the said Fig. 1, which current percolates through the coffee and through the openings 11, upwardly and through the screen 9, and so on in the path of a circle, thus extracting and retaining the aroma of the coffee on much the same principle as drip coffee almost universally preferred. Should the coffee boil up and froth form on the top of the liquid, it then rises over the top of the partition 5 and, by reason of the opening or passage way 13 is free to pass back into the compartment 7 from the front compartment 6. When the pot is tilted to dispense the coffee, the grounds are held back by the screen, thus insuring freedom from deposit.

From the foregoing, taken in connection with the accompanying drawings it will be noted that the said partition 5 may be readily removed for cleaning purposes; that the bands 17 and 18 centralize the partition 5 within the pot as well as support the same rigid, said band being either attached thereto or integral therewith; and that by the use of a pot constructed as above the full energy of the heat may be utilized without endangering a boiling over of the liquid.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. A pot having means for preventing the boiling over of the liquid contents thereof comprising a partition dividing the pot into separate compartments, the said partition being inclined from the perpendicular at its lower extremity and apertured to direct the entire current created during a boiling process toward one side of the pot and in the path of a circle, and means in proximity to each aperture to facilitate such current movement.

2. A pot having means preventing the boiling over of the liquid contents thereof comprising a vertical wall partitioning the pot into separate compartments, said partition being cut away at its top to form a passage way communicating between said compartments, said partition being further provided with a screened opening intermediate its ends, a baffle wall formed at the base of the said partition by bending the latter at an angle, the said baffle wall having openings formed therein which with the said first mentioned openings permit circulation of the heated current within the pot in the path of a circle.

3. In a pot, a partition dividing said pot into two compartments, bands rigid with said partition and engaging with the inner wall of the pot to maintain said partition centrally therein, a baffle wall formed by bending the said partition at its lowermost end, said baffle wall and said partition having openings formed therein, and a sectional top carried by said partition.

4. In an open top pot, a partition dividing said pot into two compartments, a pot top comprising a pair of top sections, one of which is hingedly connected to the other, bands rigid with the partition and engaging with the interior wall of the pot to maintain the partition immovable and centrally therein, one of the said top sections being rigid with one of the said bands, a baffle wall formed by bending the said partition at its lowermost end, the said baffle wall having openings formed therein, the said partition having a screened opening therein, the said partition being further provided with an opening at the top thereof, the said openings permitting circulation of the heated current within the pot in the path of a circle, substantially as described.

5. A pot having means preventing the boiling over of the liquid contents thereof comprising a partition dividing the said pot into two compartments, a baffle wall formed at the base of the partition, the said baffle wall directing the heated current to one side and into one of the said compartments, the said partition having a screened opening formed therein, the said baffle wall having a plurality of openings formed therein, the openings being positioned to permit circulation of the heated current within the pot from one to the other of the said compartments in the path of a circle.

6. A pot having means for preventing the boiling over of the liquid contents thereof comprising a perpendicular partition, the lower portion of the partition engaging with and extending at an angle to the bottom of the pot, the said partition providing communicating compartments, one of said compartments being larger at its base than the other of the said compartments to direct the entire current during a boiling process toward one side of the pot and in the path of a circle, substantially as described.

In testimony whereof I affix my signature in presence of two witnesses.

JAMES THOMAS.

Witnesses:
C. E. BLEIKAMP,
D. P. ENYSFIELD.

Copies of this patent may be obtained for five cents each, by addressing the "Commissioner of Patents, Washington, D. C."